Patented Dec. 26, 1939

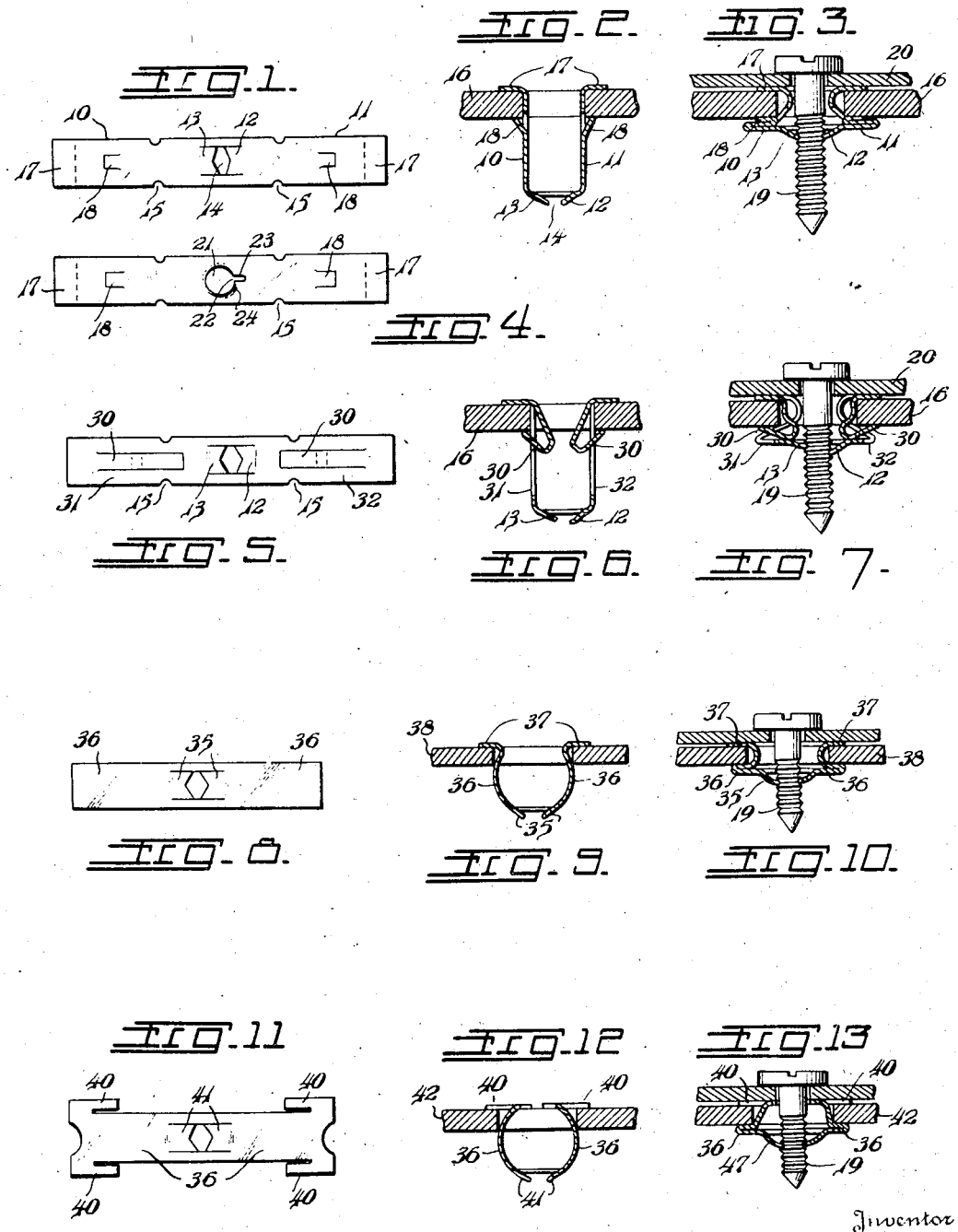

2,184,783

UNITED STATES PATENT OFFICE 2,184,783

FASTENING DEVICE

George A. Tinnerman, Rocky River, Ohio, assignor to Albert H. Tinnerman, Cleveland, Ohio Application October 14, 1936, Serial No. 105,502

1 Claim. (Cl. 85—32)

This invention relates to fastening devices that are adapted to be used with a bolt for connecting two parts together. The present invention is particularly adaptable for use in those locations where only one side of a part to be joined is accessible for making a connection.

An object of the present invention is to make a fastener which may be inserted through a bolt receiving aperture from the same side of the part to be joined from which the bolt is intended to be introduced, and in addition to make a fastener which will remain automatically in bolt-receiving position. In this connection, the invention contemplates a fastener which may be attached readily to one article, and which will remain in self-sustaining bolt-receiving position upon the article during the time the article is being fitted into place with respect to another article, until the bolt is passed through the fastener and tightened thereagainst. In some instances, the fastener is intended not only to remain in self-sustaining position upon the article, but also to act as a supporting member for holding the second article in assembled position until the bolt is inserted therethrough. To accomplish these purposes, the fastener may assume different forms, as will hereinafter be explained.

Referring now to the drawing, one form of fastener is illustrated in Figs. 1 to 3 inclusive, wherein Fig. 1 is a top plan view of a blank of which the fastener may be made; Fig. 2 is a vertical section taken through the fastener after the forming operation has been completed; Fig. 3 is a section taken through the fastener and articles that are to be joined together, and showing the position of the fastener after a bolt has been inserted therethrough and drawn tightly thereagainst; Fig. 4 is a top plan view of a blank with a modified form of bolt-thread engaging means; Figs. 5–7 inclusive illustrate a modification wherein Fig. 5 is a top plan view of the fastener blank; Fig. 6 is a section through a formed fastener before a bolt is inserted therethrough, and Fig. 7 is a vertical section through the fastener showing the position thereof with respect to the parts to be joined at the time the bolt is tightened against the fastener; Figs. 8–10 inclusive represent a further modification wherein Fig. 8 is a top plan view of a blank; Fig. 9 is a section showing the fastener before the bolt is inserted therein, and Fig. 10 is a section of the fastener after the bolt is inserted therethrough; Figs. 11 to 13 inclusive illustrate a further modification of the fastener wherein Fig. 11 is a top plan view of the blank; Fig. 12 is a vertical section through a formed fastener before a bolt is inserted therein, and Fig. 13 is a vertical section through a fastener after a bolt has been inserted therethrough.

The various forms which the invention may take have a feature that is common to all of them. Such feature comprises expansible portions, which engage in the wall of the bolt opening in the part to be joined, or one or more places of the part to be joined, and the tension of the fastener in bolt receiving position by means of the expansible characteristics of the metal of which the fastener is made. The expansible feature enables the fastener to be pushed into position from the same side of the plate upon which the bolt is inserted, wherefore, the connection may be made in only one perforation in the articles that are to be joined together. By varying the sizes and shape of the expansible portions, the fastener may be formed for use on parts of variable thickness, wherefore one size of the fastener is adapted to fit into many different assembles, thus obviating the necessity for making a specific size for each assembly, as has been the practice of previous forms of self-positioning fasteners.

Referring now to the drawing in detail, the blank as shown in Fig. 1 comprises a strip of sheet metal having two or more arms 10 and 11; adjacent the junction of the arms, bolt-thread engaging means are stamped from the metal and in the form illustrated in Fig. 1, such means comprise opposing tongues 12 and 13 which are yieldable with reference to the remaining portion of metal, and which have an opening 14 therebetween for receiving a shank of a bolt, or other fastener. Ordinarily, the arms 10 and 11 are weakened intermediately such as by marginal indentations 15. After the blank has been formed, the arms are bent out of the blank, and in the same direction, but opposite to that direction in which the tongues 12 and 13 are formed as is best shown in Fig. 2, the bending occuring adjacent the innermost ends of the arms so as to provide a receptacle into which the bolt may be inserted. The arms are formed in such relationship to the size of the opening in the part 16 to be joined that the normal tendency of the arms to spread is to hold the fastener in bolt receiving position upon the part. The flanges 17 adjacent the end of each arm limit the inward movement of the fastener with reference to the part 16. Preferably, prongs 18 are struck outwardly from the arms and are adapted, when the fastener is pushed through an opening in the supporting part 16 to be joined, to engage the opposite face of such part, and to act as an abutment for preventing inadvertent displacement of the fastener prior to the insertion of the bolt. When a bolt 19 is inserted through an opening in part 20 to be joined, the shank of the bolt initially is long enough to project through the opening 14 so that as the bolt is tightened, the arms 10 and 11 are collapsed at the weakened portions 15, and the corners are finally pulled downwardly against the inner face of the part 16, the fastener thereby corresponding to an eyelet insofar as its attachment to the part is concerned. During such tightening operation, the thread engaging portions on the tongues 12, 13 grip the thread of the bolt, and thereby hold it securely in place.

In the modification of Fig. 4, the fastener blank has the same parts as those illustrated in Fig. 1, which are correspondingly made, except for the fact that the bolt thread engaging portions comprise a circular aperture 21, which has a slot 22 extending therefrom. The slot thereby provides tongues 23 and 24, which may be bent out of the plane of the blank until the marginal edge of the aperture 21 is moved to conform to the helix of the bolt thread. The position of the fastener at the time a bolt is inserted therethrough and tightened is similar to that shown in Fig. 3.

The modification of Figs. 5 to 7 is based upon the disclosure in Figs. 1-3 inclusive but differs from it in that the prongs 30 stamped from the arms 31, 32 are longer than those indicated in Fig. 2 and are reversely bent so that upon the passage of the shank of a bolt therethrough, the prongs are forced into contact with the face of the part to be joined.

In the modification of Figs. 8 to 10 inclusive, the fastener is made from a strip of uniform width, wherein the bolt-thread engaging portions 35 are formed near the center of the strip and wherein the arms 36, Fig. 9, extend upwardly therefrom, and are each provided with a flange 37 adjacent the ends thereof limiting the inward movement of the fastener as applied to part 38. Each form of fastener may be pulled toward the supporting part to expand on tightening of the bolt, as described with reference to Fig. 3, the principal difference between the formations of Fig. 2 and Fig. 9 being, that in Fig. 2 the strip is weakened by indentations and the arms are formed in substantially a U-shape, whereas in Fig. 9, the strip is not weakened by indentations, and the arms 36 are formed substantially circular segmental in shape.

The modification of Figs. 11–13 inclusive embodies a similar fastener, which may be made from a strip having lateral extensions 40 adjacent the ends thereof, and bolt-thread engaging means 41 adjacent the midportion thereof. In this form, the end portions or lateral extensions 40 rest upon the front face of the part 42, while the intermediate arm portions 36 are curved in substantially circular segmental form with the bolt-thread engaging means 41 at the bottom thereof.

Fasteners made in accordance with the present invention may be made more economically than any collapsing fastener heretofore known, because they may be formed from a single strip of sheet metal, and because the bolt-thread engaging elements are integrally provided from the blank of which the fastener is made.

A further advantage of the present invention is the fact that the fastener may be so designed to engage the bolt as to provide a theft-proof assembly, such for example, as is desired on certain parts of motor vehicles. This is accomplished by utilizing arms that are so formed that the bolt thread is cut by the fastener, and is therefore rendered incapable of being disengaged by a mere rotation in the reverse direction.

I claim:

A one piece sheet metal fastener adapted to receive a bolt fastening for securing a member to an apertured part, said fastener comprising a section of sheet metal bent to provide a head and a shank comprising a pair of holding arms spaced by an intermediate bolt receiving portion, said bolt receiving portion having integral, preformed bolt thread engaging elements struck and formed therefrom to project out of the plane thereof, said holding arms being formed intermediate their lengths with means designed for substantial snap fastening engagement in the aperture in said part to hold said fastener in self retaining position thereon preparatory to the application of the bolt fastening thereto in securing said member to said part, said integral, preformed bolt thread engaging elements threadedly engaging the bolt fastening to cause a distortion of said holding arms of the sheet metal fastener into anchored engagement with said apertured part upon initial tightening of said bolt fastening, said integral preformed bolt thread engaging elements upon full tightening of the bolt being deformed into positive locking engagement with said bolt fastening to prevent unscrewing and accidental removal thereof.

GEORGE A. TINNERMAN.